(12) United States Patent
Choi et al.

(10) Patent No.: US 7,894,382 B2
(45) Date of Patent: Feb. 22, 2011

(54) WIRELESS COMMUNICATIONS MODE SWITCHING APPARATUS AND METHODS

(75) Inventors: Yang-Seok Choi, Portland, OR (US); Siavash M. Alamouti, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 998 days.

(21) Appl. No.: 11/618,670

(22) Filed: Dec. 29, 2006

(65) Prior Publication Data

US 2008/0159203 A1 Jul. 3, 2008

(51) Int. Cl.
*H04W 4/18* (2009.01)
*H04B 7/02* (2006.01)
*H04L 27/32* (2006.01)

(52) U.S. Cl. .................. 370/328; 370/334; 455/101; 455/69; 455/562.1; 375/299

(58) Field of Classification Search .............. 455/69, 455/101, 561, 562.1, 103, 70; 375/267, 349, 375/299, 144, 146, 147; 370/328, 334, 252, 370/208

See application file for complete search history.

(56) References Cited

U.S. PATENT DOCUMENTS

| | | | | |
|---|---|---|---|---|
| 7,103,325 | B1 * | 9/2006 | Jia et al. | 455/101 |
| 7,120,395 | B2 * | 10/2006 | Tong et al. | 455/101 |
| 7,123,887 | B2 * | 10/2006 | Kim et al. | 455/103 |
| 7,620,067 | B2 * | 11/2009 | Niu et al. | 370/465 |
| 7,664,191 | B2 * | 2/2010 | Ho et al. | 375/267 |
| 2005/0013352 | A1 * | 1/2005 | Hottinen | 375/219 |
| 2005/0119008 | A1 * | 6/2005 | Haumont | 455/456.1 |
| 2006/0133521 | A1 * | 6/2006 | Sampath et al. | 375/260 |

FOREIGN PATENT DOCUMENTS

| | | |
|---|---|---|
| WO | WO-03047197 A2 | 6/2003 |
| WO | WO-2005043855 A1 | 5/2005 |
| WO | WO-2006069300 A2 | 6/2006 |

OTHER PUBLICATIONS

"International Application No. PCT/US2007/86883, Search Report dated Apr. 30, 2008", 3 pgs.
"International Application No. PCT/US2007/86883, Written Opinion dated Apr. 30, 2008", 3 pgs.
Health, Jr., R. W., et al., "Switching Between Diversity and Multiplexing in MIMO Systems", *IEEE Transactions on Communications*, vol. 53, No. 6, (Jun. 2005), 962-668.

* cited by examiner

*Primary Examiner*—Matthew Sams
(74) *Attorney, Agent, or Firm*—Schwegman, Lundberg & Woessner, P.A.

(57) ABSTRACT

Methods and apparatus are described herein to provide for wireless communications mode switching in a MIMO communications system. Other embodiments may include a method for communicating through a MIMO channel that includes choosing a communications level for each of at least two communications mode, and calculating the spectral efficiency for the chosen communications level. The method may further include comparing the spectral efficiencies and choosing a communications mode and communications level based on the comparison. Further embodiments may include a communications apparatus that includes a transceiver, a capacity calculator and a selecting module. Other embodiments are described and claimed.

31 Claims, 3 Drawing Sheets

WIRELESS COMMUNICATIONS MODE SWITCHING APPARATUS AND METHODS

TECHNICAL FIELD

Various embodiments described herein relate generally to wireless communications and more particularly for switching between available communications modes on a wireless communications device.

BACKGROUND

Wireless devices are a ubiquitous part of every user's daily life. Through either a cell phone, Wireless Fidelity (Wi-Fi) capable laptop, a wireless broadband connection for their home, or wireless enabled Personal Digital Assistant (PDA); a user may be wirelessly connected to a wireless network continually. However, differences in the mobility of each of those devices will require a different mode of communications. In order to maximize performance for the wireless device, its' communications mode should match the mobility of the device.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

In the following detailed description of embodiments of the invention, reference is made to the accompanying drawings which form a part hereof, and in which are shown, by way of illustration, specific preferred embodiments in which the subject matter may be practiced. These embodiments are described in sufficient detail to enable those skilled in the art to practice them, and it is to be understood that other embodiments may be utilized and that logical, mechanical, and electrical changes may be made without departing from the spirit and scope of the present disclosure. Such embodiments of the inventive subject matter may be referred to, individually and/or collectively, herein by the term "invention" merely for convenience and without intending to voluntarily limit the scope of this application to any single invention or inventive concept if more than one is in fact disclosed.

Figure 1:
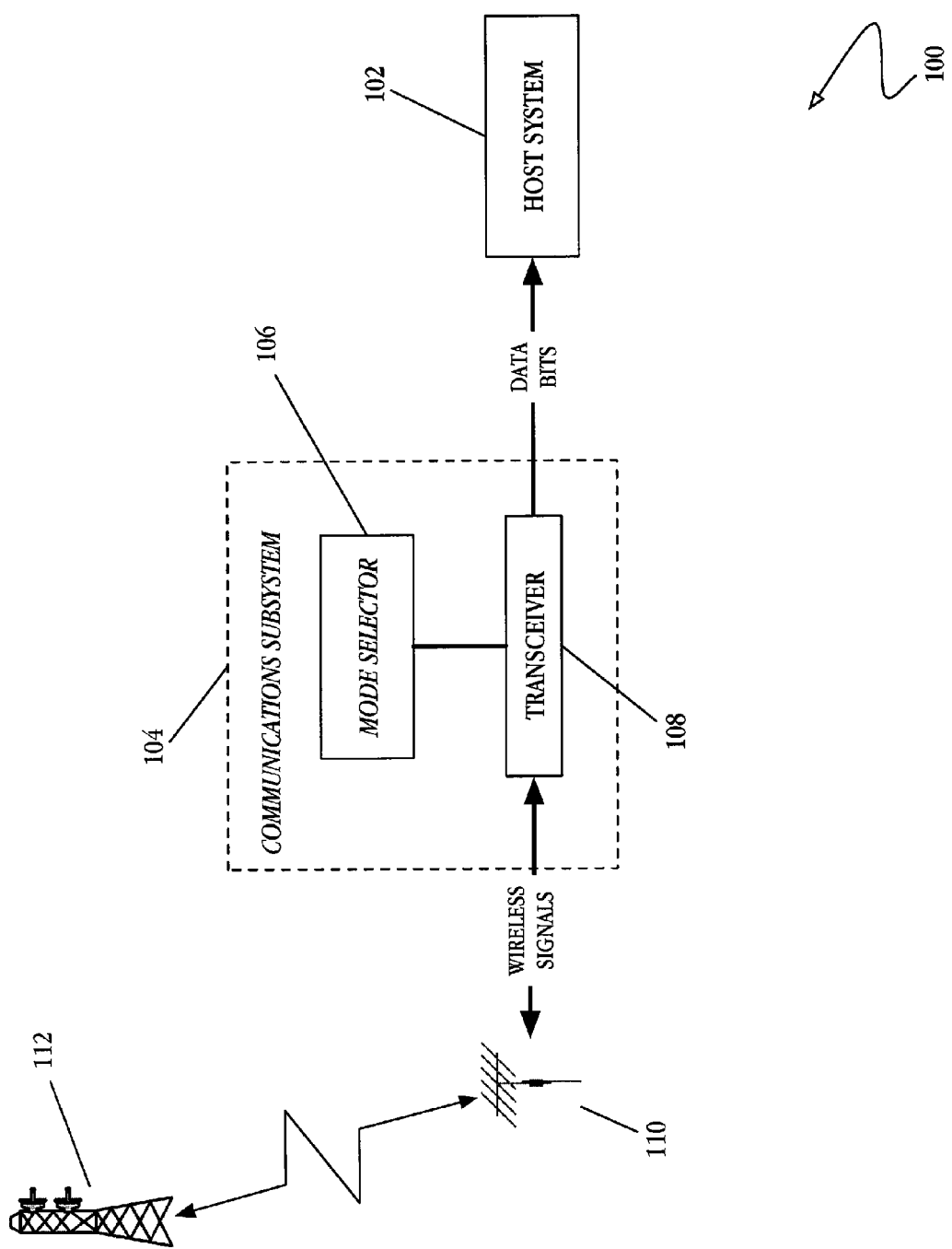
FIG. 1 shows a high level block diagram of a wireless communications system according to embodiments of the present invention.

FIG. 1 shows a high level block diagram of a wireless communications system according to embodiments of the present invention. In an embodiment, a wireless communications system 100 includes a host system 102 coupled to a communications subsystem 104. In one embodiment, the communications subsystem 104 may be contained within the host system 102 as an integral physical component. In an alternate embodiment, the communications subsystem 104 may be a separate physical component that is removably coupled to the host system 102, such as with a PCMCIA or Card Express expansion card typically used on notebook computing systems. The communications subsystem 104 includes a mode selector 106 and a transceiver 108. The transceiver 108 is configured to receive a plurality of wireless signals from an antenna 110 and output one or more data bits contained within the plurality of wireless signals to the host system 102.

The antenna 112 may include, in one embodiment, multiple-input multiple-output (MIMO) array of antennas such that more than one antenna receives signals from a wireless base station 112 and more than one antenna sends signals to the wireless base station 112. In such an arrangement, the antenna is configured to send and receive those signals using one of a plurality of communications modes which can be selected by the transceiver 108. The plurality of communication modes may include, without limitation, STBC (space time block code), SM (spatial multiplexing), beamforming, and the like. Each of the plurality of communication modes is configured to provide the best performance given a particular communications environment. For instance, spatial multiplexing increases data rate. However as the communications channel experiences rank deficient MIMO channel spatial multiplexing begins to experience higher packet error rate. Conversely, STBC can achieve a lower packet error regardless of rank condition. But STBC in cannot achieve as high a data rate as SM. As conditions change in the environment, either through added interference or the mobility of the host system and communications subsystem, it is advantageous for the communications subsystem 104 to select the communications mode that is best suited for the present conditions.

In an embodiment, the mode selector 106 is configured to select the communications mode and send the selected communications mode to the transceiver 108. The transceiver, in turn, can transmit the selected mode through the antenna 110 to the base station 112 such that future signals transmitted between the base station 112 and the antenna 110 are transmitted using the selected communications mode. This communications mode may adaptively change as conditions change in the transmission environment. The transceiver 108 may, in one embodiment, select a communications mode for each transmission symbol. In an alternate embodiment, the transceiver 108 may select a communications mode for a collection of transmission symbols. In an embodiment, the mode selector 106 is configured to select the communications mode using the channel matrix H, which is representative of the MIMO array of antennas and the Signal to Noise Ration (SNR) value. The SNR value can be either directly measured or predictively calculated.

Figure 2:
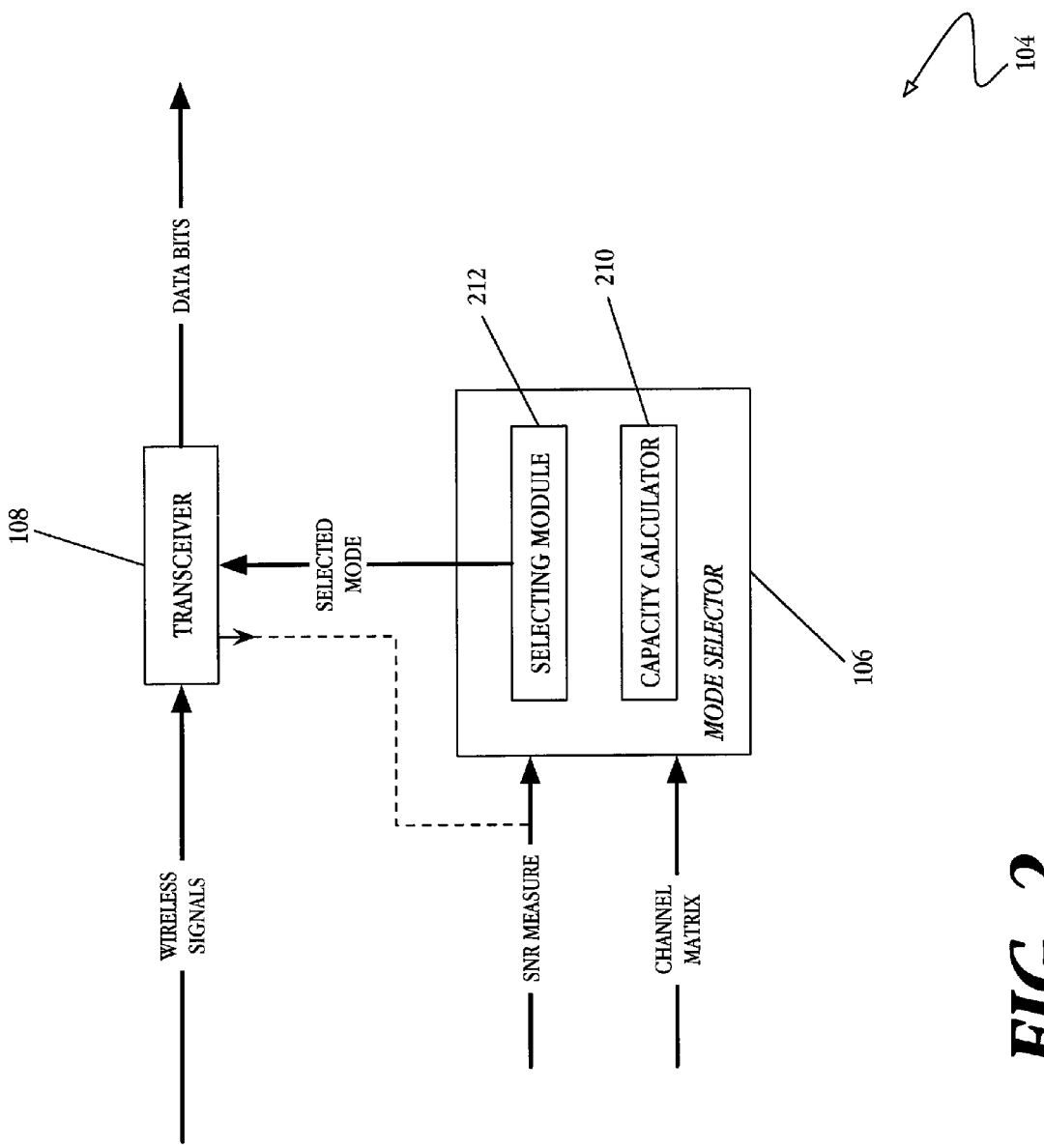
FIG. 2 shows a high level block diagram of a device according to embodiments of the present invention.

FIG. 2 shows a high level block diagram of a device according to embodiments of the present invention. In an embodiment, the mode selector module is coupled to the transceiver 108 depicted above in FIG. 1. and is configured to provide instructions to the transceiver 108 which, when received, cause the transceiver 108 to change the mode of communications that are being used to send and receive wireless signals. The transceiver 108, in further embodiments, is configured to communicate that change to a base station 112 that the transceiver 108 is receiving and sending data from. The mode may be changed with every symbol sent or received, but more commonly, a collection of symbols are sent and received prior to any change in the communications mode.

In an embodiment, the mode selector 106 includes a capacity calculator 210 and a selecting module 212. The capacity calculator 210 calculates the measured capacity of two or more communications modes, in one embodiment. In a further embodiment, the capacity calculator 210 determines which of the communications modes provides the highest spectral efficiency. Spectral efficiency is a measure of the amount of data that can be transmitted over a wireless system, and comparison of spectral efficiencies is one method of determining the optimum communications mode and level that provides an acceptable transmission error level, as expressed by packet error rate.

The capacity calculator 210 is configured to determine the highest of a plurality of a communications level can be used while still having an acceptable packet error rate. If the packet error rate is too high, data transmitted over that particular communications level of a communications mode will require multiple re-transmits of data over time, thereby decreasing the overall data rate of the transmission. Communications levels, in order of lowest to highest theoretical data rate, include, BPSK, QPSK, 16-QAM, and 64-QAM. Communications level, as used herein is meant to denote the modulation and coding scheme (MSC) chosen for a particular communications mode.

The mode selector 106 inputs the channel matrix, which is known and represents the matrix of transmit and receive (input and output) antennas in a MIMO system. For instance, a MIMO system that has two transmit and two receive antennas has a 2×2 channel matrix. The mode selector 106 also inputs the Signal-to-Noise Ratio (SNR) value that is either predicted or measured. In the former case, the mode selector 106 calculates the expected SNR value providing an SNR value that allows the mode selector 106 to proactively determine the best communications mode for the conditions. In the latter case, the mode selector 106 reads the experienced, or measured, SNR value and selects the communications mode that would be best suited for what is being experienced. Additionally, the mode selector 106 may, in some embodiments, use a combination of techniques and use historical data to predict what the future SNR value may be. In either case, by using the SNR value and the channel matrix, the mode selector 106, through the capacity calculator 210 can determine for each of at least two communications modes, the highest communications level that provides an acceptable packet error rate, and for each of those calculate a spectral efficiency. By comparing the spectral efficiency the selector module can then choose the best communications mode, which can be sent to the transceiver 108.

Figure 3:
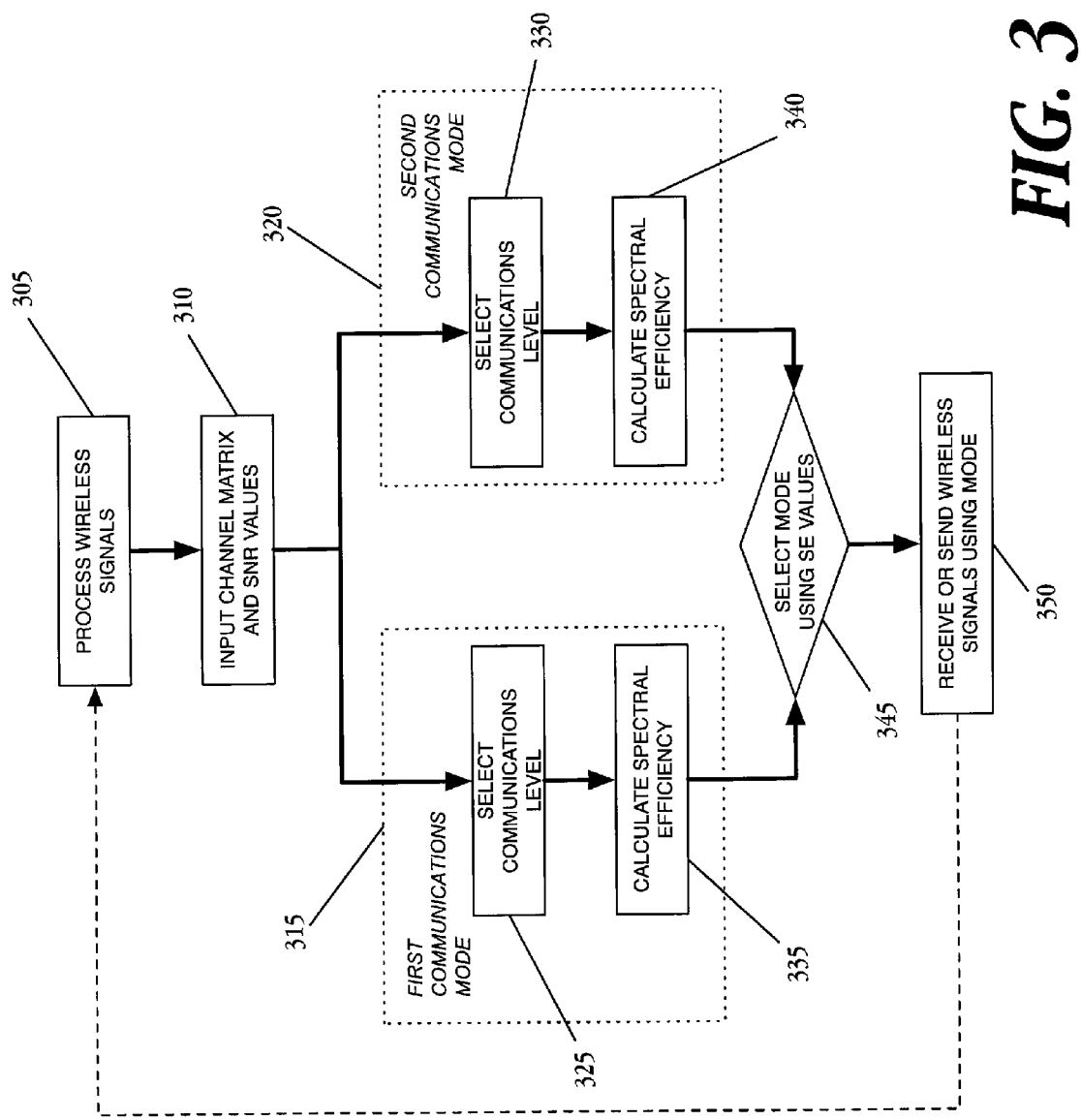
FIG. 3 shows a flowchart of a method according to embodiments of the present invention.

FIG. 3 is a flowchart of a method according to embodiments of the present invention. The structural configuration of a mode selector has been discussed above with respect to FIG. 1 and FIG. 2. With reference to FIG. 3, the method of calculating those values can be discussed.

At block 305, wireless signals are processed. The wireless signals may be received over two or more receiver antennas or sent through two or more receive antennas. In either case, the wireless signals are processed using a selected communications mode and a selected communications level. The communications mode and level are selected according to the further operations depicted in FIG. 3 and described herein.

At block 310, the channel matrix H and an SNR value are input. The SNR value may be obtained by querying the transceiver 108 directly for actual measured SNR values, or it may be predictively calculated using measured SNR values and expected future conditions, such as increased mobility and the like.

At block 315 and block 320, operations regarding at least two communications modes are performed. As discussed above, more then two communications modes are possible without departing from the scope of the present discussion provided that a communications mode is selected from at least two predetermined communications modes. In one embodiment, the first and second communications modes are STBC and SM. For each of the first and second communications modes, a communications level, or MCS level, is selected at blocks 325 and 330 that yield a predicted packet error rate that is within the allowable levels. For that MCS level, the spectral efficiency is calculated at block 335 and 340 for each of the first and second communications modes.

The spectral efficiencies are compared at block 345 and the communications level of the communications mode that achieves the highest expected spectral efficiency is selected. In one embodiment, the spectral efficiency is calculating based on the maximum communications level for a communications mode, a packet error prediction function for that communications level and the theoretical maximum spectral efficiency for that communications level. Spectral efficiency for spatial multiplexing includes the number of transmit antennas in a further embodiment. Further discussion of spectral efficiency calculations can be found below.

The wireless signals are received or sent at block 350 using that selected communications mode and communications level. The operations depicted in FIG. 3 are continuous and operations return to block 305 for further calculations. This provides the apparatus the ability to adaptively respond to changing transmission conditions.

The operations described above are an abstraction intended to convey the overall operations carried out by the mode selector depicted above. At a high level, the mode selector 106 discussed above seeks to overcome the known shortcomings of each of the plurality of communications modes. For the purpose of a more focused discussion, only two modes of communication will be discussed herein, spatial multiplexing (SM) and space time block coding (STBC). In order to overcome the deficiencies of each of SM and STBC, adaptive mode switching is provided for in the 802.16 standard (IEEE std. 802.16-2001, published 2001 and later versions). When the channel is favorable to SM, SM is selected. Otherwise, STBC is selected.

Given the performance of the channel, either observed or predicted, the packet error event for each mode is predicted, and the best mode and the best MCS level is selected. Due to mobility and delay spread, the channel's performance is both time and frequency selective, and an individual codeword, or communications symbol, may see multiple channel qualities. Key to proper switching of the communications mode is the proper prediction of the packet error event given a particular communications level of a particular communication mode. In an embodiment, the function for packet event predictor of STBC for the k-th MCS level is defined as:

$$f_{STBC,k}(H, SNR) = \begin{cases} 0 & \text{when no packet error} \\ 1 & \text{when packet error} \end{cases}$$

where H is the channel matrix. The k-th MCS level that maximizes the predicted spectral efficiency can be found by:

$$SE_{STBC} = \max_k (1 - f_{STBC,k}) c_k$$

where $c_k$ represents the theoretical maximum spectral efficiency of k-th MCS and $SE_{STBC}$ is the estimated spectral efficiency. This spectral efficiency can be compared to the spectral efficiency for the maximum MCS level under SM, which is provided for in the following equation:

$$SE_{SM} = N \max_{k}(1 - f_{SM,k})c_k$$

where N is the number of transmit antennas. Comparing the two maximum spectral efficiencies and choosing the communications mode and then the particular level, the mode selector 106 can transmit the selected mode to the transceiver 108, which can then transmit and receive further signals from the base station 112. This can broadly be defined as link adaptation (LA). Adapting the communications mode over changing conditions may broadly be called adaptive mode switching (AMS) and can be treated in the same manner as LA. Therefore if $SE_{SM} > SE_{STBC}$, then SM is chosen and the link can be adapted dynamically to provide for that. If $SE_{SM} \leq SE_{STBC}$, then STBC is chosen. As STBC typically exhibits lower packet error rates than SM, STBC is chosen when the spectral efficiencies are equal.

Predicting the packet error event provides the best result for LA and AMS. Less optimal packet error event predictors may yield a selected communications mode that is in turn less than optimal for the conditions that the wireless communications device is operating under. In order to properly and accurately predict the packet error event, the capacity concept is used for calculations, in one embodiment. The capacity of a channel is also known as the maximum achievable mutual information. For general MIMO systems, capacity can be defined by:

$$C = \max I(d; y | H = H) = \log_2 \det\left(I + \frac{SNR}{N} HH^H\right)$$

If the transmitted frames have a spectral efficiency larger than the capacity defined above, packet error rate will approach 100%. The outage probability at the outage capacity at $c_0$ can be found by $Pr(C<c_0)$, and is the PER of the ideal MIMO code. In non-ideal systems the outage probability acts as a lower bound of non-ideal MIMO code PER of packets whose spectral efficiency is $c_0$. In order to more tightly define the lower bound, the capacity definition can be extended to the particular transmitted and receiver structure, in some embodiments. Using the Alamouti code, capacity can then be written for an STBC system as:

$$C_{STBC} = \log_2\left(1 + \frac{SNR}{N} Tr\{H^H H\}\right)$$

where $Tr(.)$ is a trace operation. Following from this, the packet error predictor function for the k-th MCS can be written as:

$$f_{STBC,k}(H, SNR) = \begin{cases} 0 & \text{if } C_{STBC} \geq c_k \\ 1 & \text{if } C_{STBC} < c_k \end{cases}$$

As real world conditions will probably not be the same as mathematical calculations due to implementation loss, the thresholds for packet error predictor calculations can be modified based on measurements and/or simulations and can be expressed as:

$$f_{STBC,k}(H, SNR) = \begin{cases} 0 & \text{if } C_{STBC} \geq \tilde{c}_k \\ 1 & \text{if } C_{STBC} < \tilde{c}_k \end{cases}$$

where $\tilde{c}_k$ represents an adjusted threshold capacity level based on measurements and/or simulations.

In one embodiment, the packet error rate can be drawn as a function of instantaneous capacity $C_{STBC}$. Using such an approach yields less variance in the capacity required to achieve a PER target of 10%. This is true even for varying antenna correlations. Varying antenna correlations present a problem for predicting PER in that there is such a large variation of Direction on Arrival (DOA), which is essentially random. By applying instantaneous capacity to the problem, a threshold $c_k$ value can be obtained. For example, assuming a 2×2 channel matrix, the theoretical spectral efficiency for 16 QAM (Define QAM) ½ rate code is 2 bps/Hz. However, as discussed above, non-ideal conditions as provided for using non-ideal convolutional code, provides a 3 bps/Hz $c_k$ value needed for a 10% target PER.

The same concept used for STBC can also be applied to SM. Using a minimum mean square error equalizer, in one embodiment, the mean capacity as a channel quality indicator for SM can be expressed as:

$$C_{SM,mean} = \frac{1}{N} \sum_{k=1}^{N} \log_2(1 + SINR(k))$$

and the SINR for the k-th receive antenna can be defined as:

$$SINR(k) = \frac{1}{\left[\left(I + \frac{SNR}{N} H^H H\right)^{-1}\right]_{kk}} - 1$$

However, unlike the STBC case presented above, a larger variance in required capacity is observed. Though the representation of the PER by the mean capacity actually yields smaller variance that by average SNR. The non-ideal ck can be obtained by taking the mean of the required mean capacities. The variance for SM calculations can be reduced further by recognizing that when an arbitrary codeword sees finite number of channel qualities and that finite number is small, the PER is governed mainly by the minimum channel quality. This is especially true in the high code rate case. Following on this, the channel quality indicator can be defined as:

$$C_{SM,min} = \min_{k} \log_2(1 + SINR(k))$$

which yields a smaller variance of PER. What follows is that the highest SINR is irrelevant to the prediction of the PER. Therefore the packet error predictor function for SM for the k-th MCS can be defined as:

$$f_{SM,k}(H, SNR) = \begin{cases} 0 & \text{if } C_{SM,\min} \geq \tilde{c}_k \\ 1 & \text{if } C_{SM,\min} < \tilde{c}_k \end{cases}$$

As the thresholds are obtained from target PER given actual channel conditions, the predictor will predict whether PER meets the target PER under actual conditions. Due to mobility and multipath, a codeword will face multiple channel qualities. In this scenario, the mean of the capacity will be used, which can be expressed as:

$$C = \frac{1}{M}\sum_{m=1}^{M} C_m$$

where M is the number of symbols in a codeword and $C_m$ is the capacity of m-th symbol.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Some embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A set of instructions stored on a non-transitory computer readable memory that, when executed by a processor, perform a method for communicating through a multiple input multiple output (MIMO) channel, the method comprising:
    inputting a channel matrix and a signal-to-noise ratio (SNR) value;
    choosing a communications level for each of at least two modes of communication by predicting the communications level that yields an acceptable packet error rate for each of the at least two modes of communication, wherein the acceptable packet error rate is calculated as a function of the MIMO channel matrix and a signal to noise ratio (SNR) of signals received through the MIMO channel; and
    calculating a spectral efficiency for the chosen communications level of each of the two modes of communications and selecting one of the at least two modes of communications that has the highest spectral efficiency with the chosen communications level,
    wherein selecting one of the at least two communication modes includes selecting a communication mode that includes a space time block code (STBC) and the spectral efficiency of the STBC mode is expressed as:

$SE = \max_k(1-f_{STBC,k})c_k$;

wherein SE is the spectral efficiency, $c_k$ represents the maximum spectral efficiency of the k-th modulation and coding scheme (MCS), and $f_{STBC,k}$ defines the function for a packet error event predictor of STBC for the k-th modulation and coding scheme (MCS) level.

2. The set of instructions stored on a non-transitory computer readable memory of claim 1, further comprising:
    processing at least one symbol of a wireless communication received from a base station using the selected one of the at least two modes of communications.

3. The set of instructions stored on a non-transitory computer readable memory of claim 1, wherein the at least two modes of communications are MIMO modes of communications and include at least one of the following: Space time trellis codes (STC), spatial multiplexing, beamforming, Antenna selection, beam selection, Closed loop MIMO, and Multi-user MIMO.

4. The set of instructions stored on a non-transitory computer readable memory of claim 3, wherein, the at least two modes of communications are pre-matched to the mobility of the mobile device.

5. The set of instructions stored on a non-transitory computer readable memory of claim 3, further comprising:
    recalculating the spectral efficiency for the at least two modes of communications for further symbols of the wireless communication and adaptively switching the communications mode using the recalculated spectral efficiency.

6. The set of instructions stored on a non-transitory computer readable memory of claim 1, wherein the communications level includes at least one of the following: BPSK, QPSK, 16-QAM and 64-QAM.

7. The set of instructions stored on a non-transitory computer readable memory of claim 1, further comprising, repeating the operations after a pre-determined number of symbols are received and processed.

8. The set of instructions stored on a non-transitory computer readable memory of claim 1, wherein the pre-determined number of symbols is selected based on the mobility of the device receiving the symbols.

9. The set of instructions stored on a non-transitory computer readable memory of claim 1, wherein the communications level is chosen by comparing a measured capacity value against predetermined threshold values to determine if the packet error rate is acceptable.

10. The set of instructions stored on a non-transitory computer readable memory of claim 1, wherein the SNR is predicted based on expected conditions.

11. The set of instructions stored on a non-transitory computer readable memory of claim 1, wherein the calculating the spectral efficiency wherein the calculation is based on the chosen communications level for one of the at least two modes of communication, a packet error prediction function for the mode of communication, and the theoretical maximum spectral efficiency for the chosen communications level.

12. A communications apparatus for processing two or more data streams, the apparatus comprising:
a transceiver with one or more receive antennas;
a capacity calculator to calculate the measured capacity of two or more communications modes and to calculate which of one or more communications levels for each of the two or more communications modes achieves the highest spectral efficiency by predicting the communications level that yields an acceptable packet error rate for each of the at least two modes of communication, wherein the acceptable packet error rate is calculated as a function of the multiple input multiple output (MIMO) channel matrix and a signal to noise ratio (SNR) of signals received through the MIMO channel; and
a selecting module to select which of the communications mode achieves the highest spectral efficiency for at least one of the one or more communications levels, wherein the communications mode is space time block code (STBC) and spectral efficiency of the STBC mode is expressed as:

$$SE = \max_k (1 - f_{STBC,k}) c_k;$$

wherein SE is the spectral efficiency, $c_k$ represents the maximum spectral efficiency of the k-th modulation and coding scheme (MCS), and $f_{STBC,k}$ defines the function for a packet error event predictor of STBC for the k-th modulation and coding scheme (MCS) level.

13. The apparatus of claim 12, wherein the transceiver is configured to send and receive wireless transmissions using at least two communications mode, wherein the two communications modes include at least one of the following: (MIMO mode list), Space time trellis code (STC), spatial multiplexing, beamforming, Antenna selection, beam selection, Closed loop MIMO, Multi-user MIMO.

14. The apparatus of claim 12, wherein the capacity calculator is configured to predictively calculate the measured capacity.

15. The apparatus of claim 12, wherein the capacity calculator is configured to calculate the measured capacity through the use of measured and predicted values in combination.

16. The apparatus of claim 12, wherein the transceiver is configured to switch communications modes and to communicate the communications mode to a base station that the transceiver is sending and receiving wireless communications from.

17. A communications apparatus for processing two or more data streams, the apparatus comprising:
a transceiver with one or more receive antennas;
a capacity calculator to calculate the measured capacity of two or more communications modes and to calculate which of one or more communications levels for each of the two or more communications modes achieves the highest spectral efficiency by predicting the communications level that yields an acceptable packet error rate for each of the at least two modes of communication, wherein the acceptable packet error rate is calculated as a function of the multiple input multiple output (MIMO) channel matrix and a signal to noise ratio (SNR) of signals received through the MIMO channel; and
a selecting module to select which of the communications mode achieves the highest spectral efficiency for at least one of the one or more communications levels, wherein the communications mode is spatial multiplexing (SM) and the spectral efficiency of the SM mode is expressed as:

$$SM = N \max_k (1 - f_{SMV,k}) c_k;$$

wherein the SM is the modulation and coding scheme (MCS) level that maximized the estimated spectral efficiency for vertically coded SM, N is the number of transmit antennas, $c_k$ represents the maximum spectral efficiency of the k-th MCS, and $f_{SMV,k}$ is the function for packet error event predictor of SMV for the k-th modulation and code scheme level.

18. The apparatus of claim 17, wherein the capacity calculator is configured to predictively calculate the measured capacity.

19. The apparatus of claim 17, wherein the capacity calculator is configured to calculate the measured capacity through the use of measured and predicted values in combination.

20. The apparatus of claim 17, wherein the transceiver is configured to switch communications modes and to communicate the communications mode to a base station that the transceiver is sending and receiving wireless communications from.

21. A multiple input multiple output (MIMO) communications system, the system comprising:
a communications subsystem comprising:
a transceiver with two or more transmit and receive antennas;
a capacity calculator to calculate the measured capacity of two or more communications modes and to calculate which of one or more communications levels for each of the two or more communications modes achieves the highest spectral efficiency,
wherein the capacity calculator is operable to concurrently calculate the measured capacity of two or more communications modes and determine a highest communications level of those communications modes based on a comparison between a measured capacity and a theoretical capacity to predict a packet error rate; and
a selecting module to select which of the communications mode achieves the highest spectral efficiency for at least one of the one or more communications levels, wherein the communications mode is space time block code (STBC) and the spectral efficiency of the STBC mode is expressed as:

$$SE = \max_k (1 - f_{STBC,k}) c_k;$$

wherein SE is the spectral efficiency, $c_k$ represents the maximum spectral efficiency of the k-th modulation and coding scheme (MCS), and $f_{STBC,k}$ defines the function for a packet error event predictor of STBC for the k-th modulation and coding scheme (MCS) level, and
two or more omni-directional antennas coupled to the transceiver.

22. The system of claim 21, wherein the transceiver is configured to send and receive wireless transmissions using at least two communications mode, wherein the two communications modes include at least one of the following: space time block code (STBC), Space time trellis code (STC), spatial multiplexing, beamforming, Antenna selection, beam selection, Closed loop MIMO, and Multi-user MIMO.

23. The system of claim 21, wherein the capacity calculator is configured to predictively calculate the measured capacity.

24. The system of claim 21, wherein the capacity calculator is configured to calculate the measured capacity through the use of measured and predicted values in combination.

25. The system of claim 21, wherein the transceiver is configured to switch communications modes and to communicate the communications mode to a base station that the transceiver is sending and receiving wireless communications from.

26. The system of claim 21, wherein the measured capacity of the two or more communications mode is the mean of the capacity.

27. A multiple input multiple output (MIMO) communications system, the system comprising:
- a communications subsystem comprising:
    - a transceiver with two or more transmit and receive antennas;
    - a capacity calculator to calculate the measured capacity of two or more communications modes and to calculate which of one or more communications levels for each of the two or more communications modes achieves the highest spectral efficiency,
- wherein the capacity calculator is operable to concurrently calculate the measured capacity of two or more communications modes and determine a highest communications level of those communications modes based on a comparison between a measured capacity and a theoretical capacity to predict a packet error rate; and
    - a selecting module to select which of the communications mode achieves the highest spectral efficiency for at least one of the one or more communications levels, wherein the communications mode is spatial multiplexing (SM) and the spectral efficiency of the SM mode is expressed as:

$$SM = N\max_k(1 - f_{SMV,k})c_k;$$

wherein the SM is the modulation and coding scheme (MCS) level that maximized the estimated spectral efficiency for vertically coded SM, N is the number of transmit antennas, $c_k$ represents the maximum spectral efficiency of the k-th MCS, and $f_{SMV,k}$ is the function for packet error event predictor of SMV for the k-th modulation and code scheme level, and two or more omni-directional antennas coupled to the transceiver.

28. The system of claim 27, wherein the capacity calculator is configured to predictively calculate the measured capacity.

29. The system of claim 27, wherein the capacity calculator is configured to calculate the measured capacity through the use of measured and predicted values in combination.

30. The system of claim 27, wherein the transceiver is configured to switch communications modes and to communicate the communications mode to a base station that the transceiver is sending and receiving wireless communications from.

31. The system of claim 27, wherein the measured capacity of the two or more communications mode is the mean of the capacity.

* * * * *